US009224131B2

(12) United States Patent
Gruen et al.

(10) Patent No.: US 9,224,131 B2
(45) Date of Patent: Dec. 29, 2015

(54) SYSTEM AND METHOD FOR FACILITATING COLLABORATION IN A SHARED EMAIL REPOSITORY

(75) Inventors: Daniel M. Gruen, Newton, MA (US); Michael Muller, Medford, MA (US); Paul B. Moody, Hyde Park, VT (US)

(73) Assignee: International Business Machines Corporation, Armonk, NY (US)

( * ) Notice: Subject to any disclaimer, the term of this patent is extended or adjusted under 35 U.S.C. 154(b) by 1318 days.

(21) Appl. No.: 10/747,465

(22) Filed: Dec. 29, 2003

(65) Prior Publication Data
US 2005/0160145 A1 Jul. 21, 2005

(51) Int. Cl.
*G06Q 10/00* (2012.01)
*G06F 15/16* (2006.01)
*G06Q 10/10* (2012.01)

(52) U.S. Cl.
CPC .................................. *G06Q 10/107* (2013.01)

(58) Field of Classification Search
CPC .................................................. G06Q 10/107
USPC ................... 709/205, 206, 219; 715/751–753
See application file for complete search history.

(56) References Cited

U.S. PATENT DOCUMENTS

| | | | |
|---|---|---|---|
| 5,293,619 A * | 3/1994 | Dean ............................. | 707/204 |
| 6,105,055 A * | 8/2000 | Pizano et al. ................. | 709/204 |
| 6,222,533 B1 * | 4/2001 | Notani et al. ................. | 715/733 |
| 6,594,693 B1 * | 7/2003 | Borwankar .................... | 709/219 |
| 6,816,887 B1 * | 11/2004 | Shaw et al. .................... | 709/207 |
| 7,219,130 B2 * | 5/2007 | Kumar et al. .................. | 709/206 |
| 7,222,156 B2 * | 5/2007 | Gupta et al. ................... | 709/206 |
| 2002/0099775 A1 * | 7/2002 | Gupta et al. ................... | 709/205 |

FOREIGN PATENT DOCUMENTS

| | | |
|---|---|---|
| JP | 11-215178 | 8/1999 |
| JP | 2000-105731 | 4/2000 |
| JP | 2002-18390 | 6/2002 |
| KR | 20020005318 A | 1/2002 |
| KR | 20020089076 A | 11/2002 |

OTHER PUBLICATIONS

Rhonda Chambers, Dean Crockett, Greg Griffing, and Jehan-Francois Paris. A Java tool for collaborative editing over the Internet. In Proceedings of the 1998 Energy Sources Technology Conference and Exhibition (ETCE '98), Houston, TX, Feb. 1998. [retreived on the Internet Apr. 25, 2009].*
M. Perry, D. Agarwal, "Collaborative Editing within the Pervasive Collaborative Computing Environment", The 5th International Workshop on Collaborative Editing, ECSCW 2003, Helsinki, Finland, Sep. 15, 2003. [retreived from the Internet Apr. 25, 2009].*

(Continued)

*Primary Examiner* — Saleh Najjar
*Assistant Examiner* — Oleg Korsak
(74) *Attorney, Agent, or Firm* — Schmeiser, Olsen & Watts LLP

(57) ABSTRACT

The present invention facilitates collaboration on electronic messages. Methods are provided in which an electronic message is stored and presented to users. A user is allowed to perform an action on the electronic message and the action is recorded. Additionally, the record is associated with the electronic message. The users are notified of the action.

23 Claims, 6 Drawing Sheets

(56) References Cited

OTHER PUBLICATIONS

Werner Geyer, Jürgen Vogel, Li-Te Cheng, Michael Muller, Supporting activity-centric collaboration through peer-to-peer shared objects, Proceedings of the 2003 international ACM SIGGROUP conference on Supporting group work, Nov. 9-12, 2003, Sanibel Island, Florida, USA [retrived from ACM database on Jul. 16, 2010].*

Moran, A.L.; Favela, J.; Martinez, A.M.; Decouchant, D.; "Document presence notification services for collaborative writing", Groupware, 2001. Proceedings. Seventh International Workshop on, 2001. pp. 125-133. Sep. 6, 2001-Sep. 8, 2001. [retrieved from IEEE database on Jan. 4, 2011].*

Michael J. Muller, Daniel M. Gruen, "Working together inside an emailbox", Proceedings of the ninth conference on European Conference on Computer Supported Cooperative Work. Sep. 2005. [retrieved from ACM Jan. 4, 2011].*

Dave Chaffey (Groupware, Workflow and Intranets, 1998, 263 pages).*

Marc Zehngut (Shared Mail: Today and Tomorrow, Oct. 1, 1998, 10 pages).*

Munehiro, Mori, et al. :Design and prototype of a system for making online manuals by cooperative work, ISPJSIG Notes 95-GW-10-2, Mar. 2, 1995.

Hutchins, E (1995) Cognition in the wild, Cambridge, MA:MIT Press, pp. 379-380.

K. Schmidt, et al. (1992) "Taking CSCW seriously: Supporting Articulation Work", Computer Supported Cooperative Work, vol. 1, pp. 7-40.

D. Gruen, et al. (1999) "collaborative Assistant for E-mail", In Proceedings of ACM CHI'99 Conference on human Factors in Computing Systems, Extended Abstracts, pp. 196-197.

B. Nardi, et al. (2000) Interaction and Outeraction: Instant Messaging in Action; Acm Conference on ComputerSupported Cooperative Work, Philadelphia, Dec. 2-6, 2000, CSW 2000 Proceedings, pp. 79-88.

N. Ducheneaut, et al. (2001) "Email as Habitat: An Exploration of Embedded Personal Information Management", In ACM Interactions, Sep.-Oct. 2001, pp. 30-38.

S. Whittaker, et al. (1996) "Email Overload: Exploring Personal Information Management of Email", Conference on Human Factors in Computing Systems, CHI 96 Conference Proceedings, Vancouver, BC Apr. 13-18, 1996, pp. 276-283;and.

L. Sproull, et al. (1991) Connections News Ways of Working in the Networked Organization, Cambridge: MIT Press.

* cited by examiner

FIGURE 3

SYSTEM AND METHOD FOR FACILITATING COLLABORATION IN A SHARED EMAIL REPOSITORY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention relates to email and electronic communications and more particularly to facilitating collaboration on shared email messages.

There are many situations in which two or more people share responsibility for a single email inbox and communication stream. Such situations exist in several contexts, one of which is the collaboration that occurs between managers and assistants who share access and responsibility for the same mail file. Another arises when a single inbox is used for communication with a team or organization, and several people in the team must work together to be sure incoming messages are handled appropriately.

Collaborators who wish to make use of shared email inboxes need a way to coordinate their work, to discuss how messages should be handled, to know which messages have already been handled and be sure none are overlooked, and to see which are currently being worked on.

Current email tools were designed with the single user in mind. Users frequently make use of structures created for individual use to coordinate their shared work. For example, folders are used as a way to communicate priority or to indicate actions that should be taken, such as a "To Print" folder. Features allowing received mail to be edited are sometimes used to communicate additional information about a message or to report on how an issue had been handled. For example, users may annotate a message with comments or instructions for other users. Messages are frequently forwarded between managers and assistants as a way of drawing attention to them, and to discuss how they should be handled.

Such methods and systems are generally piecemeal and ineffective. Any policies established by the participants for collaboration exist externally to the messaging system, and therefore may be forgotten or ignored by the users. In addition, the provisions provided by the current methods are frequently incomplete and inefficient. A single message may be forwarded between parties multiple times to share annotations or to draw attention to it. Such schemes increase the number of emails that a user is required to handle and thereby decrease productivity. What is needed is a system and method for facilitating collaboration between users of a shared email inbox.

SUMMARY OF THE INVENTION

In some embodiments, the invention provides methods and systems for enabling collaboration on electronic messages. An electronic message is stored and presented to users. A user is allowed to perform an action on the electronic message and the action is recorded. Additionally, the record is associated with the electronic message. The users are notified of the action.

In some embodiments, the invention further provides systems and methods for enabling collaboration on electronic messages. A common user interface to a shared email mailbox is provided. The user interface enables a user to collaborate on an electronic message stored in the mailbox. A user is allowed to perform collaborative work on the electronic message, and notification is provided, through the common interface, of the collaborative work done by the user.

In some embodiments, systems and methods are provided for facilitating collaboration on an electronic message, in which there are one or more email clients connected to an email server. Included is a shared email repository connected to the email server. The shared email repository is effective to receive an electronic message through the email server and provide access to the electronic message to the one or more email clients. The shared email repository is further effective to create a record of an action relating to the electronic message and enable the one or more email clients to view the electronic message and the record.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 3 is a picture depicting a display of a user interface screen in accordance with an embodiment of the invention;

DETAILED DESCRIPTION OF THE PREFFERED EMBODIMENT

Figure 1:
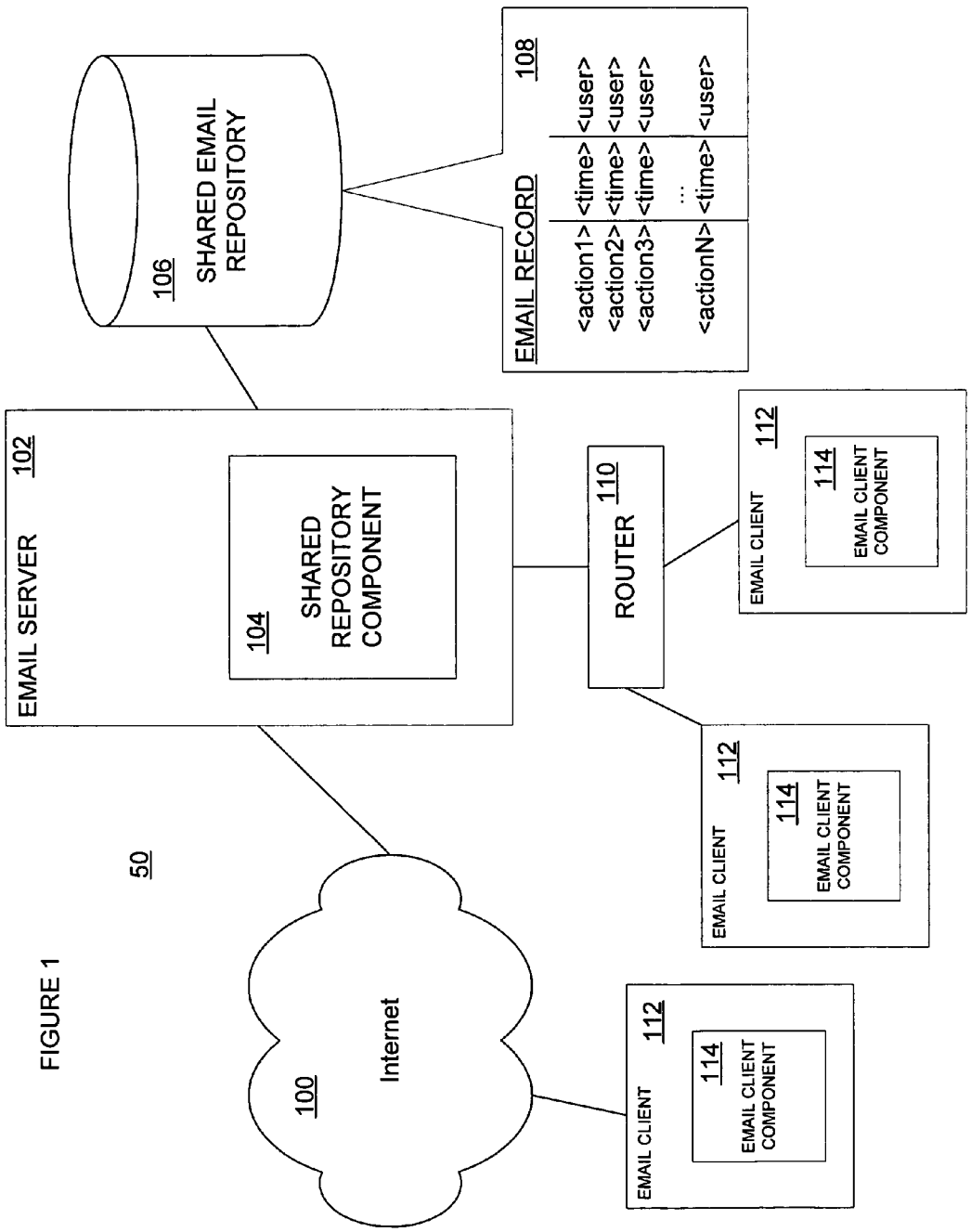
FIG. 1 is a network architecture diagram in accordance with an embodiment of the invention.

Embodiments of the present invention are now described in detail with reference to the drawings in the figures. As described in more detail, the present invention provides a system and method for collaboration in a shared email repository. The invention provides a shared mailbox for users to collaborate on email messages and offers mechanisms for facilitating interactions between users regarding the messages in the shared email mailbox. The mailbox is provided through storage of email in a shared email repository and through providing a common interface for users to collaborate on email messages.

The invention comprises a system, method, or program product in which email messages or other communications are made accessible to more than one user, either through a shared repository such as, a shared inbox or a shared out-box, or through copies of the messages available to users individually. The invention may also include systems or methods by which the current and past actions of users on each message are tracked and stored, and presented or made available for inspection to other users. This allows each user to see what, if anything, is currently being done with a message, who is doing it, and what was done in the past. The actions so tracked include but need not be limited to moving to a folder, reading, responding, printing, deleting, and annotating. The invention also includes a system or method by which each user can add a textual or speech annotation to a message, which could be kept private or made available to other users who have access to the message. This can provide users with a lightweight and freeform mechanism by which they can discuss a message and how it should be handled, store additional information about a message, indicate an intention to handle a message, or similar communications. The invention may include an easy-to-access mechanism by which multiple people can view a message together at the same time through a single command or action, allowing them to discuss the message while referring to different sections, or edit the contents of a proposed outgoing feature together.

The invention may also track the actions of users, by providing a shared out-bound repository and record of outgoing emails such as replies and forwarded messages. This may be through a shared outbox in addition to a shared inbox for received messages. The shared repository may be associated with a shared sender's address—e.g., "customer-care-center@company.com." The shared sender's address may indicate a group of recipients or collaborators. Incoming messages to the shared sender's address would be received in a shared repository to enable actions by a group of users. Outgoing mail from a shared repository may indicate that the message was sent from a shared sender's address. In addition, an outbound message may appear to be from an individual user while the repository and mailbox from which it originated is a shared repository or a shared mailbox. In some embodiments, a user may have the option of designating an outgoing message as coming from the individual user or from a group of collaborators and a shared mailbox. For example, a reply to message may be designated as coming from a group and therefore handled by a shared inbox, or may be designated as coming only from the author of the reply. In some embodiments, the default may be to treat replies as collaborative while enabling a user to override this setting.

Outgoing messages, drafted, for example, as responses, forwards or replies to incoming messages to the shared repository may be associated with the original, received message. Additionally, actions on or with outgoing messages drafted, for example, as responses, forwards or replies to incoming messages to the shared repository may be associated with the original, received message.

Referring to FIG. 1, a system 50 in accordance with the invention is shown. Email may arrive into a server 102 through the Internet 100 or through client devices 12 at the email server 102. Email clients 112 may connected to email server 102 through the Internet or through a local network such as an intranet or through a router 110. Additionally, networked devices, such as an email client 112 or an email server 102, may be connected using any network protocol including both wired and wireless. A device may be a computer, a handheld device or any device connected to a computer network. Additionally a computer may refer to any computerized device, including handhelds, desktops, and laptops.

Received email is stored in a shared email repository 106, which is connected to the email server 102 through a shared repository component 104. The shared email repository 106 may be a module executing on the email server 102, a separate dedicated storage computer, a database, or part of a storage area network. Shared email repository 106 may be used as a repository for email messages or any type of electronic message.

The shared email repository 106 stores records of emails in system 50. An email record 108 is produced by the shared email repository 106 and includes data structures capable of recording actions taken with regards to a particular email. Such records 108 may include the time the action was taken and a user who performed the action. Actions may include history of chat session, annotations, printing, reading, responding, forwarding, or editing. In addition, a status field may indicate whether the action has been done, is currently being done, or will be done in the future. Furthermore, the record 108 may include text of annotations or any fields needed to facilitate collaboration. In addition, the repository 106 may include data structures capable of storing email in folders or mailboxes, such as an inbox, "sent mail," or "top priority." Certain mailboxes may be designated as collaborative while others may be designated for a single user. Actions with emails are coordinated through the shared repository component 104 on the email server 102. The shared repository component 104 may execute on one or more computers or devices and may communicate with one or more email servers 102. The shared repository component 104 may create a synchronous link between clients 112 and the server 102 to facilitate exchange of notification regarding actions on emails.

Email client 112 provides a user with the ability to collaborate with other users on emails. The email client component 114 may execute on the email client computer 112 or may execute on other devices. The email client component 114 transmits messages to the server 102 or receives messages from the server 102, both through a computer network such as the Internet or an intranet. The email client component 114 provides the user with an interface for designating actions, performing actions and viewing actions taken by others. The email client component 114 need not generate displays directly, but rather may send instructions to a display component such as a windowing toolkit or an operating system. The email client component 114 may transmit a message to the server 102 indicating that a user has performed an action on an email. It may send a synchronous notification whenever a user is currently performing an action on an email. The synchronous notification may be transmitted to the server 104 or directly to other clients 112 collaborating on the email. In addition, the email client component 114, provides an interface for displaying synchronous notifications, allows for annotations to be entered regarding emails and may facilitate a shared editing session between two or more users on one email.

Figure 2:
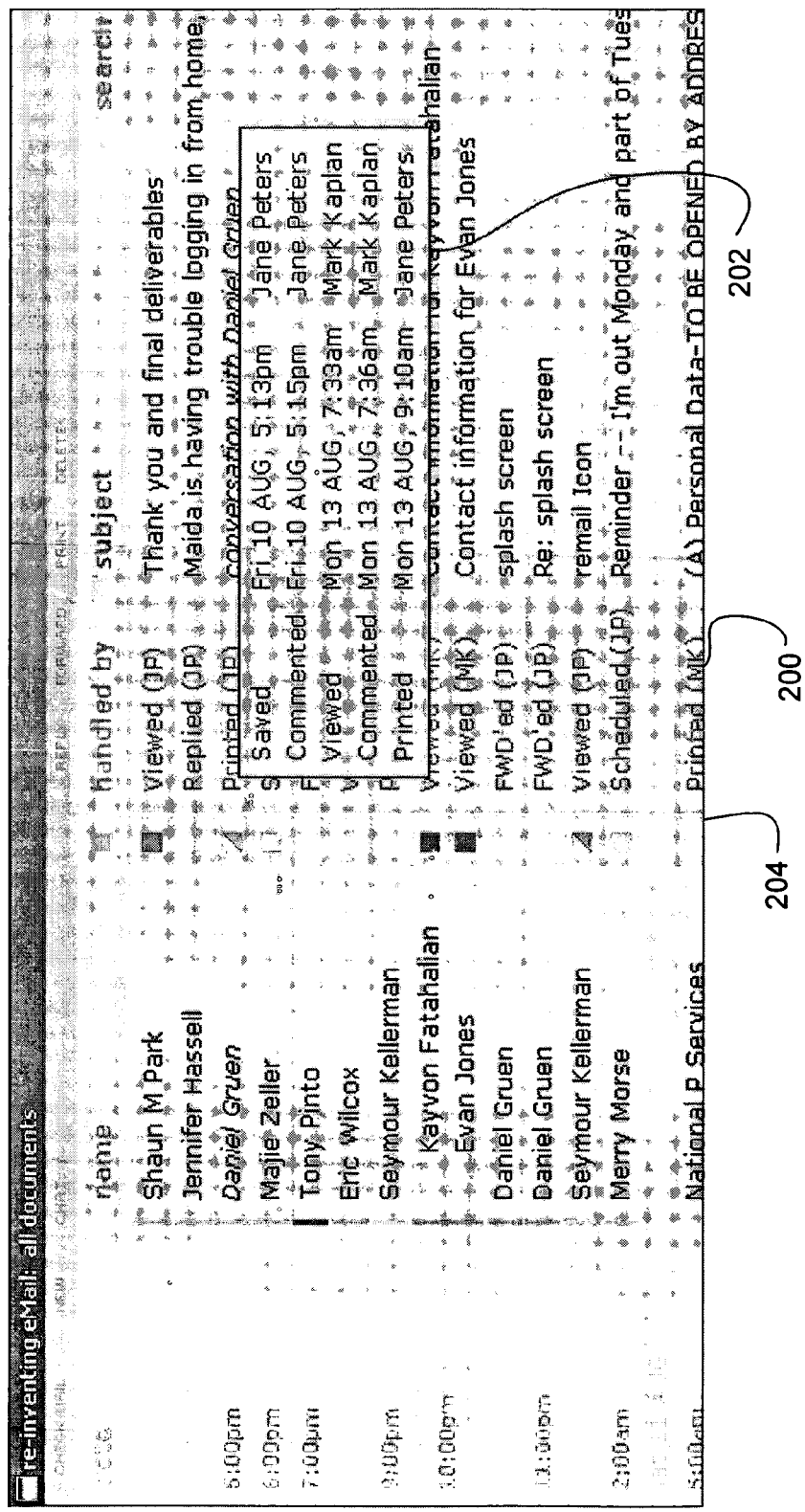
FIG. 2 is a picture depicting a display of a user interface screen in accordance with an embodiment of the invention.

FIG. 2 shows one possible view of a user interface for a shared email inbox. The display shows an indication of collaborative work done by those with access to the shared inbox. Collaborative work may include opening, reading, forwarding, replying to, sending, editing, or annotating an email. One or more users of the shared inbox may be grouped into a set of collaborators. The inbox would be accessible to only members of that set.

With reference to FIG. 2, the lighter columns in the center 200 and 204 are used here to show information related to the shared work of different users collaborating on each message. Each row in the display shows information relating to one particular email. The text in column 200, for example "Viewed (JP)," shows the last action someone did with the message and gives the initials of the person who did it. That is, a user with initials JP viewed the message. This text could show the last significant action someone did for example, showing the latest reply to the message, while not showing a later reading of the message. Box 202 indicates the history of actions associated with one of the messages. In addition, the time of each action may be displayed as well as the user who performed the action. The box 202 may be viewed by moving a cursor or mouse pointer over the text in column 200 or by clicking on the text in column 200. In addition, a keyboard shortcut may exist to view the items in the box 200. Colored boxes 204 are flags that indicate that a message was annotated. In some embodiments, other indicators may be used for users with visual disabilities. Other columns in the display shown in FIG. 2 may include the sender of the message, the recipient of the message the time the message was sent or received, and the subject of the message. Other items normally associated with email messages may be displayed as well.

Figure 3:
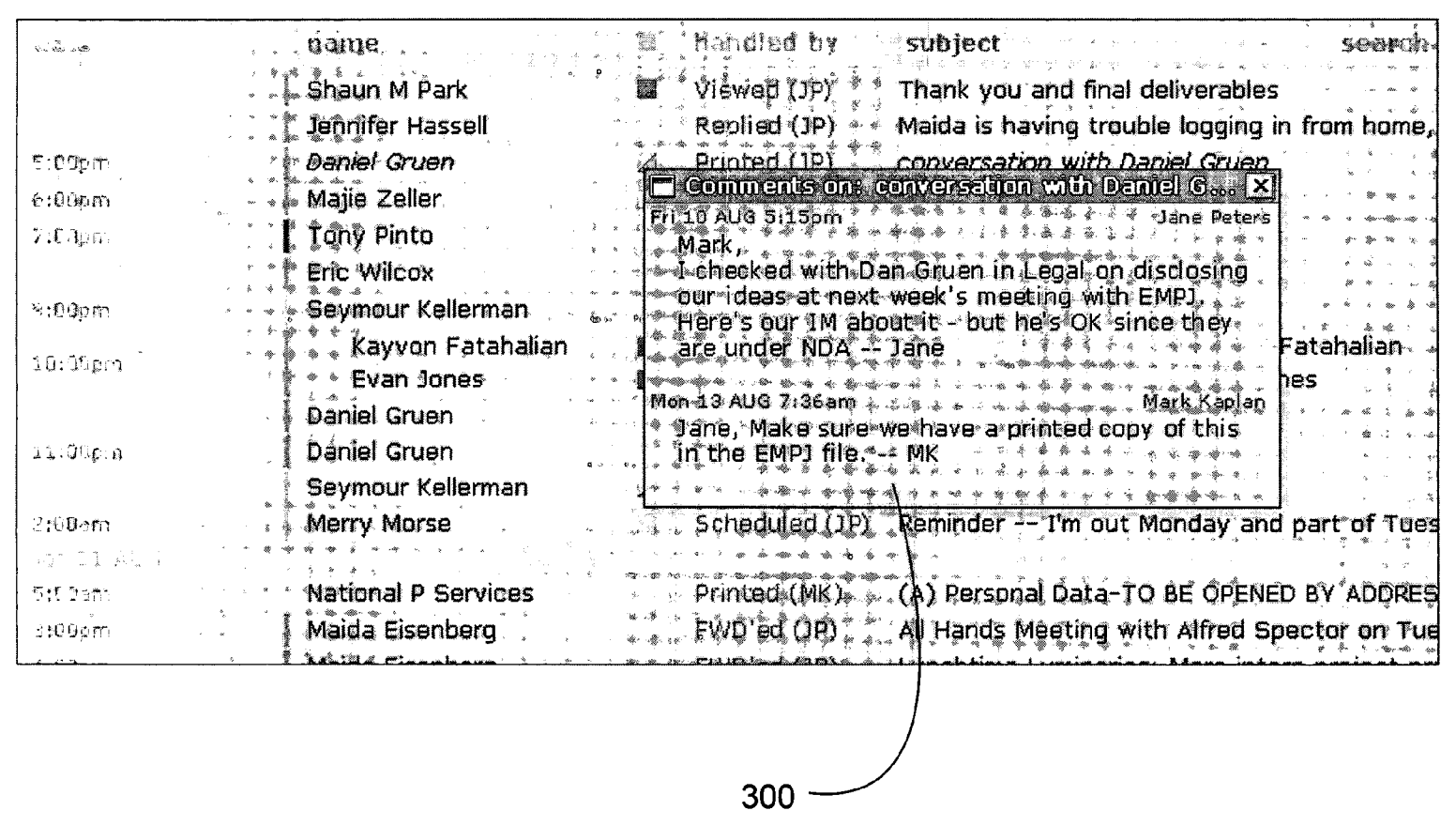

FIG. 3 shows an embodiment of a user interface depicting a shared annotation associated with an email message. Box 300 displays annotations associated with a particular message. It may available through the display shown in FIG. 2. In one example, Jane first annotated the message on Friday, Aug. 10; Mark later added to this annotation on Monday, Aug. 13. Annotations may be added, deleted, or viewed through box 300.

Figure 4:
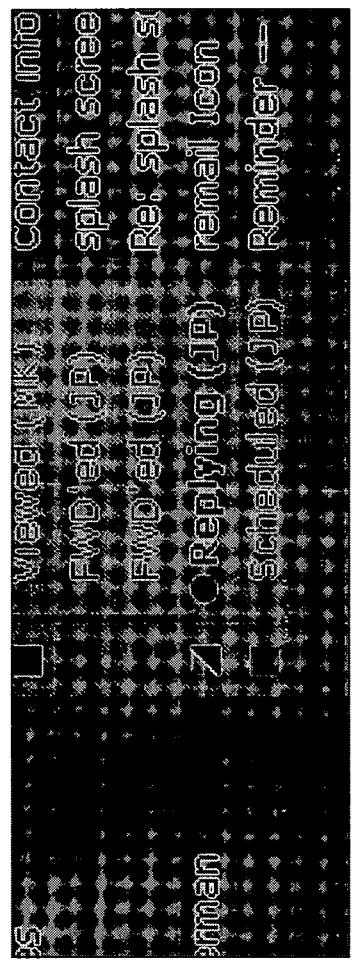
FIG. 4 is a picture depicting a display of a user interface screen in accordance with an embodiment of the invention.

FIG. 4 shows an embodiment of a user interface indicating current activity on a message. Here the user interface indicates that "JP" is replying to the message in question. Changing the properties of text in the column may show the indication of current activity. The display shown in FIG. 4 may be one of the entries in column 200 of FIG. 2, discussed above.

Figure 5:
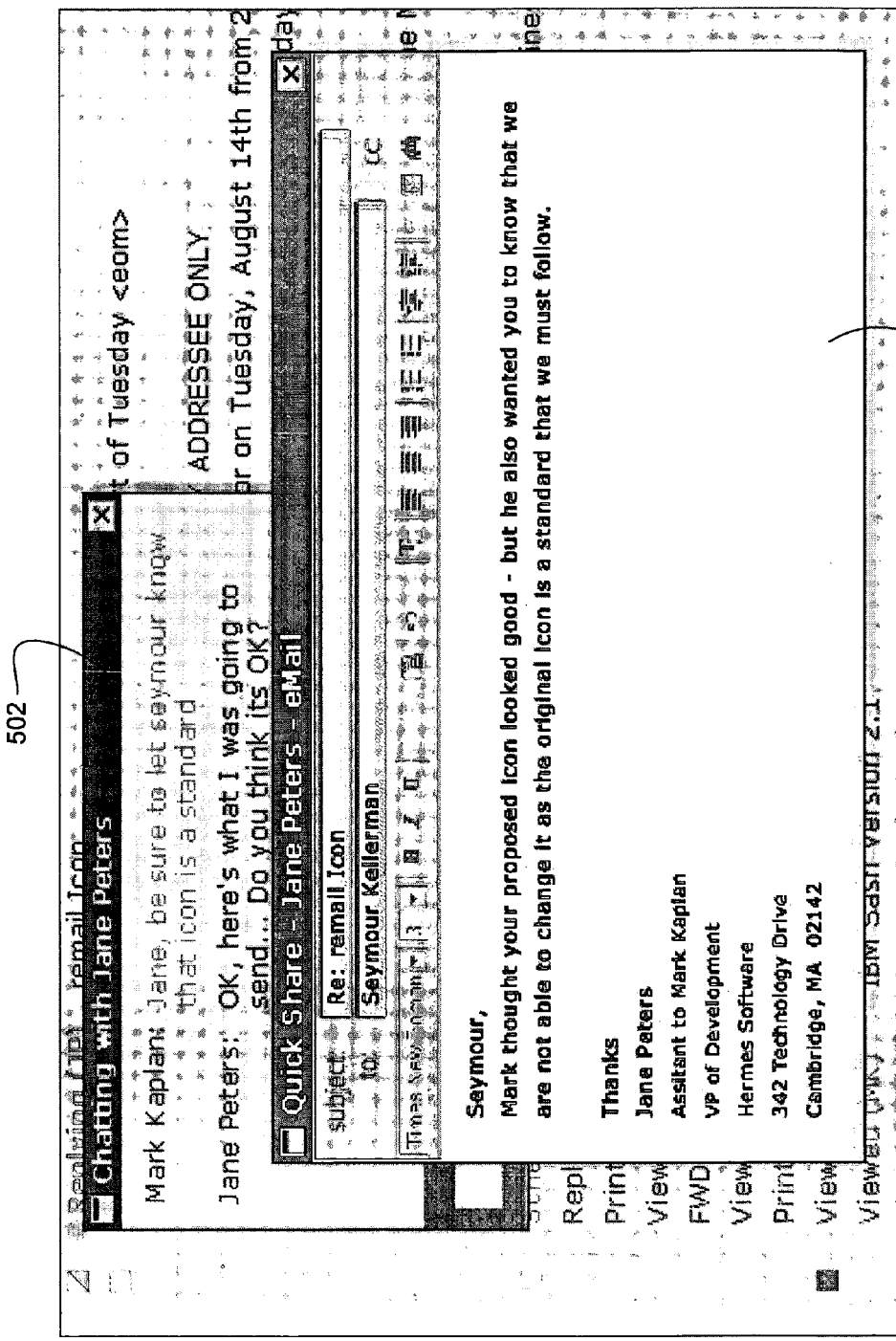
FIG. 5 is a picture depicting a display of a user interface screen in accordance with an embodiment of the invention.

FIG. 5 illustrates collaboration on a reply to a message. Box 500 shows a shared screen session in which two parties collaborate on a response being crafted. The shared editing session shown in box 500 may be started through a menu, icon, or other user action. In addition a shared editing session could be started through a chat session with another user. Box 502 shows a chat session regarding an email message. A chat session may be started through a menu, a pop-up menu or other user action. In addition a chat session may be started through a buddy-list menu, where other collaborators or users are listed. Transcripts of chat sessions may be saved similar to annotations.

The items in FIGS. 3 and 5 may be opened through clicking on the screen or through selecting each item, or through menu items. The displays shown in FIGS. 3 and 5 may be shown as popup windows over the display discussed with regards to FIG. 1.

Other embodiments may include text based displays or displays optimized for wireless devices. In addition, in some embodiments, options for collaboration and displays indicating collaboration may be available in conjunction with the display of an open email or alternative displays of an email mailbox. Additionally, system 50 may be used to collaborate on other forms of communication such as faxes, telephone calls, or any type of electronic message.

Figure 6:
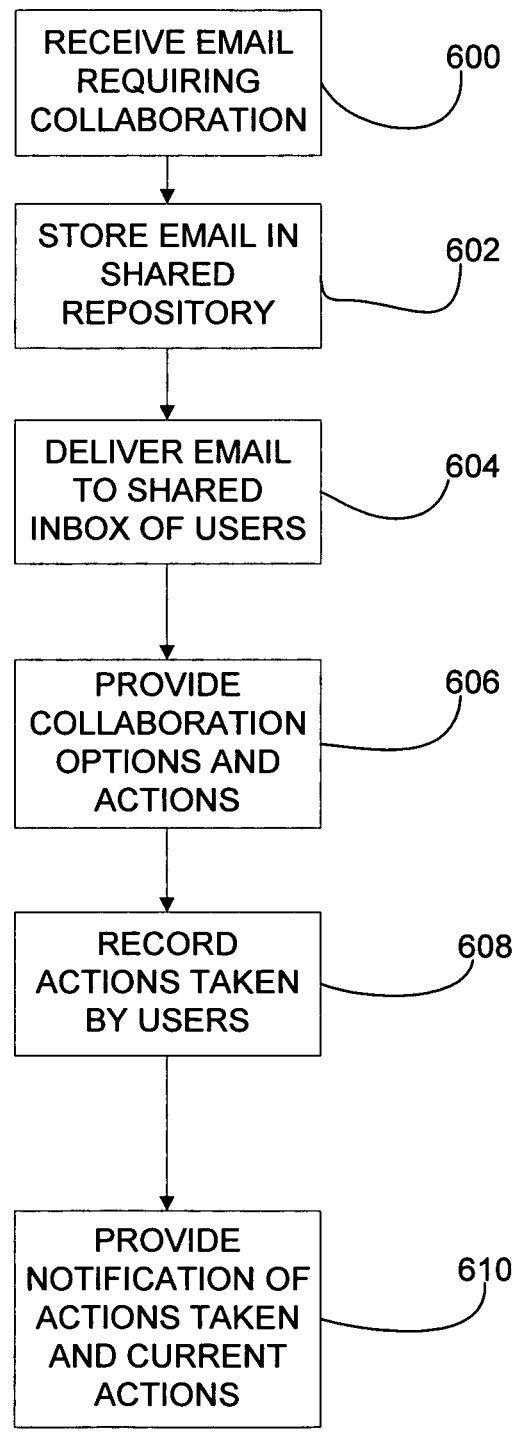
FIG. 6 is a flow chart illustrating a process for collaborating in a shared email repository in accordance with an embodiment of the invention.

Referring to FIG. 6 there is shown a method in accordance with the invention. Email is received at step 600. The email is stored in a shared repository, step 602. The email is delivered to the shared inbox of users who wish to collaborate on the email or message, step 604. At step 606, options are presented for actions that may be taken such as, replying, printing, forwarding or deleting. In addition, options to collaborate may be presented including, annotating, shared editing of, or chatting about the email. Actions taken by users are recorded, step 608. Notification is provided to other users collaborating on the email or message of actions that have been taken or that are currently being taken, step 610.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for enabling collaboration on electronic messages, the method comprising:
   grouping two or more users into a set of collaborators;
   storing, by an email server, electronic messages being collaborated on by members of the set of collaborators in an email repository in communication with the email server;
   providing a common interface for an electronic message mailbox containing the electronic messages stored in the email repository, the common interface being common to the members of the set of collaborators such that the members of the set of collaborators share access to the electronic message mailbox;
   viewing through the common interface, by two or more members of the set of collaborators, each using an electronic mail client to communicate with the email server to access the electronic message mailbox, the electronic message mailbox containing the electronic messages stored in the email repository; and
   displaying, at each electronic mail client, through the common interface, (1) one or more of the electronic messages contained in the electronic message mailbox, and (2) an indicator of actions that have been taken on a given electronic message by members of the set of collaborators, said actions comprising annotations to the given message by the members.

2. The method of claim 1 wherein the actions displayed by the indicator further comprise chat sessions, printing, reading, viewing, commenting, scheduling, responding, forwarding, editing and posting a list of past and current actions taken by the members.

3. The method of claim 1, wherein the common interface enables the set of collaborators to collaborate via the common interface on a given electronic message stored in the electronic message mailbox, the given electronic message being addressed to a shared-recipient address, the shared-recipient address being associated with individual recipient addresses of the group of users wherein each member of the group of users is granted access to a shared electronic message inbox of electronic messages addressed to the shared-recipient address;
   allowing at least two users of the group of users to perform collaborative work on the given electronic message via the common interface, including an editing session using a chat session to generate an updated message of the given electronic message; and
   providing notification, through the common interface, of the collaborative work done by the at least two users on the given electronic message, notification to the group of users using the shared-recipient address, the notification including presenting the updated electronic message to the group of users, as well as a stored transcript of the chat session to the group of users designated by the individual recipient addresses, the electronic notification being addressed to the shared-recipient address wherein the transmission of the updated electronic message is received from individual recipient addresses corresponding to the at least two users.

4. The method of claim 3, wherein the allowing collaborative work comprises allowing a message to be transmitted.

5. The method of claim 3, wherein the allowing collaborative work comprises allowing a message to be edited.

6. The method of claim 3, wherein the allowing collaborative work comprises allowing a message to be annotated.

7. The method of claim 3, wherein the given electronic message comprises an email message.

8. The method of claim 3, wherein the common interface comprises a graphical user interface comprising the indicator of actions performed on the given electronic message and identification of the at least two users associated with the action.

9. The method of claim 8, wherein the graphical user interface comprises a display of zero or more messages associated with a time, a subject, and at least one sender.

10. A system for facilitating collaboration on an electronic message, the system comprising:
   an email server in communication with an email repository, the email server storing electronic messages being collaborated on by members of a group of collaborators in the email repository;
   a common interface for an electronic message mailbox containing the electronic messages stored in the email repository, the interface being common to the members of the group of collaborators such that the members of the group of collaborators share access to the electronic message mailbox and the electronic messages contained therein; and
   first and second email clients, in communication with the email server, through which two or more members of the group of collaborators share access to the electronic message mailbox, each electronic mail client viewing through the common interface the electronic message mailbox containing the electronic messages stored in the email repository, each electronic mail client displaying, in response to viewing the electronic message mailbox through the common interface, (1) one or more of the electronic messages contained in the electronic message mailbox, and (2) an indicator, visibly associated with a given one of the one or more displayed electronic messages, of actions that have been taken on that given electronic message by members of the group of collaborators, said actions comprising annotations to the given message.

11. The system of claim 10 wherein the actions further comprise chat sessions, printing, reading, viewing, commenting, scheduling, responding, forwarding, editing, and posting a list of past and current actions taken by the members.

12. The system of claim 10, wherein the given electronic message comprises an email message.

13. The system of claim 10, wherein the email repository is further effective to send an electronic message through the email server.

14. The system of claim 10, wherein the first and second email clients are effective to provide a user interface.

15. The system of claim 10, wherein the common interface is effective to provide a visual notification via the indicator of each action comprising an indication of a type of action performed on the given electronic message and an identification of at least one member of the group of collaborators associated with the action.

16. The system of claim 10, wherein an action comprises a message transmitting action.

17. The system of claim 10, wherein an action comprises a message editing action.

18. The system of claim 10, wherein an action comprises a message annotating action.

19. A method for enabling collaboration on electronic messages, the method comprising:
   grouping two or more users into a set of collaborators;
   sharing an electronic mail inbox exclusively among members of the set of collaborators;
   viewing, by two or more of the members, the electronic mail inbox, each of the two or more members viewing the electronic mail inbox through a separate electronic mail client;
   displaying, to each of the two or more members viewing the electronic mail inbox, (1) each email message being collaborated upon by the members of the set of collaborators and, (2) an indicator visibly associated with each email message of actions taken on that email message by the members, said actions comprising a list of past and current actions taken by the members.

20. The method of claim 19 wherein one or more members of the set of collaborators simultaneously selects and works on a different said email message.

21. The method of claim 19 wherein more than one member is simultaneously viewing the electronic mail inbox.

22. The method of claim 19 wherein one or more of the members is viewing the indicator in real time.

23. The method of claim 19 wherein the actions further comprise annotations, chat sessions, printing, reading, viewing, commenting, scheduling, responding, forwarding and editing.

* * * * *